Jan. 5, 1926.  
O. A. HOKANSON  
TYPEWRITER  
Filed June 6, 1924  
1,568,736  
9 Sheets-Sheet 2

Inventor  
Otto A. Hokanson  
By Nissen & Crane  
Atty

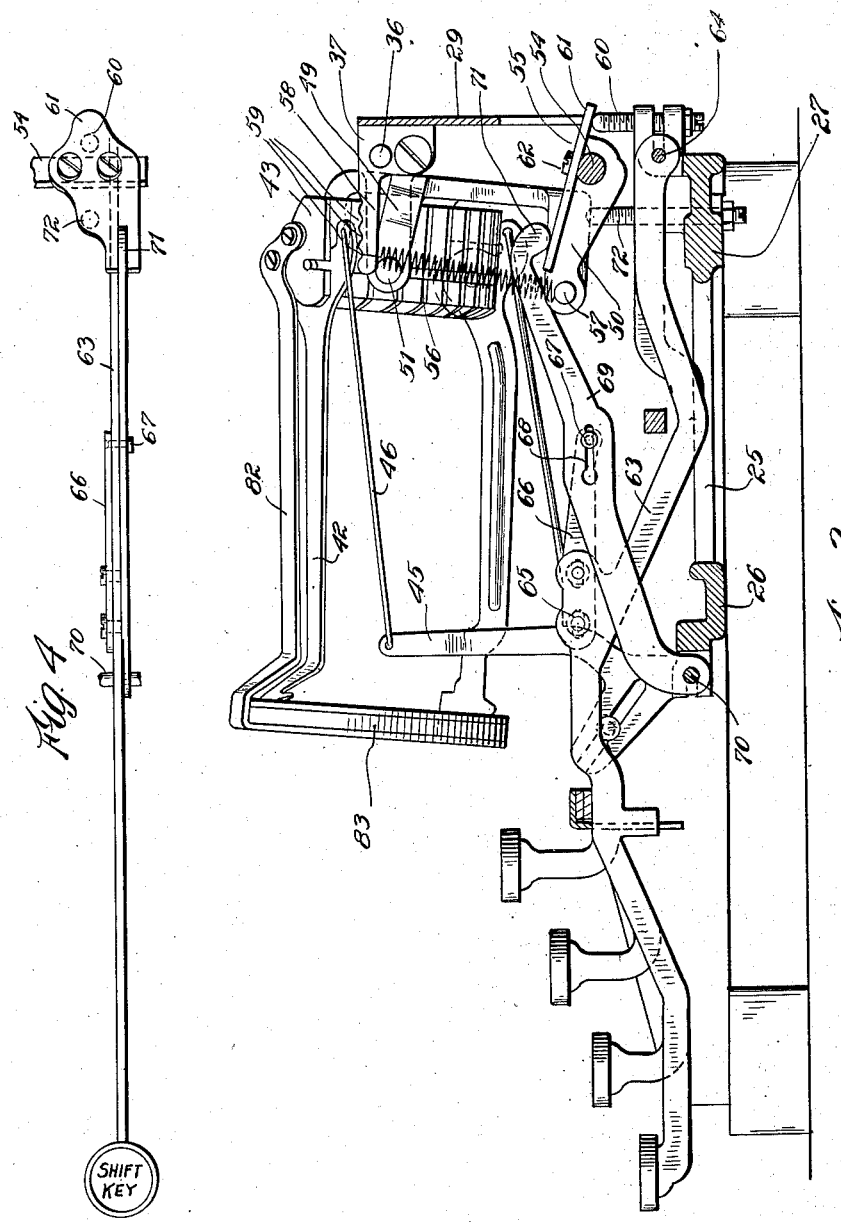

Jan. 5, 1926.
O. A. HOKANSON
1,568,736
TYPEWRITER
Filed June 6, 1924    9 Sheets-Sheet 4
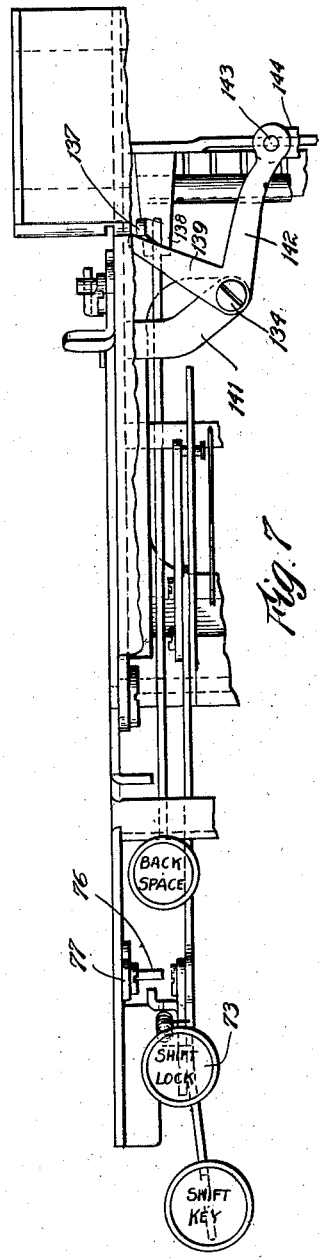
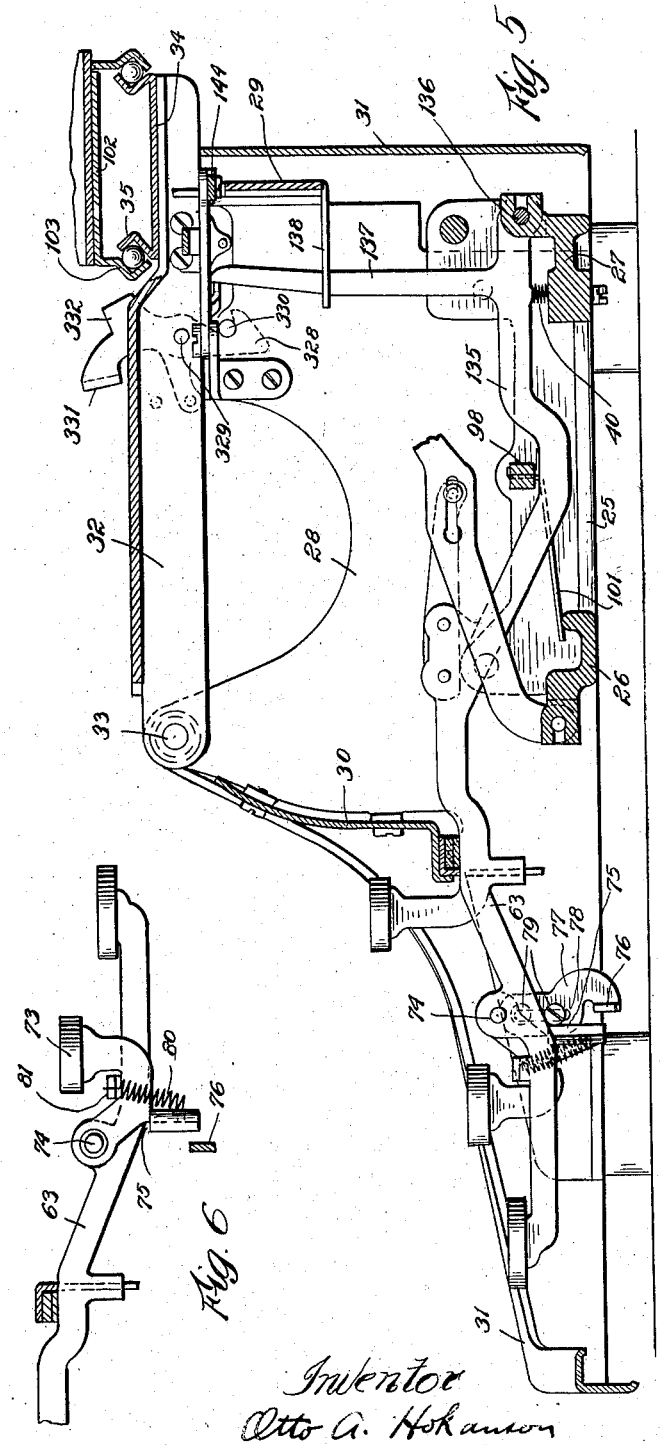

Jan. 5, 1926. 1,568,736
O. A. HOKANSON
TYPEWRITER
Filed June 6, 1924 9 Sheets-Sheet 5
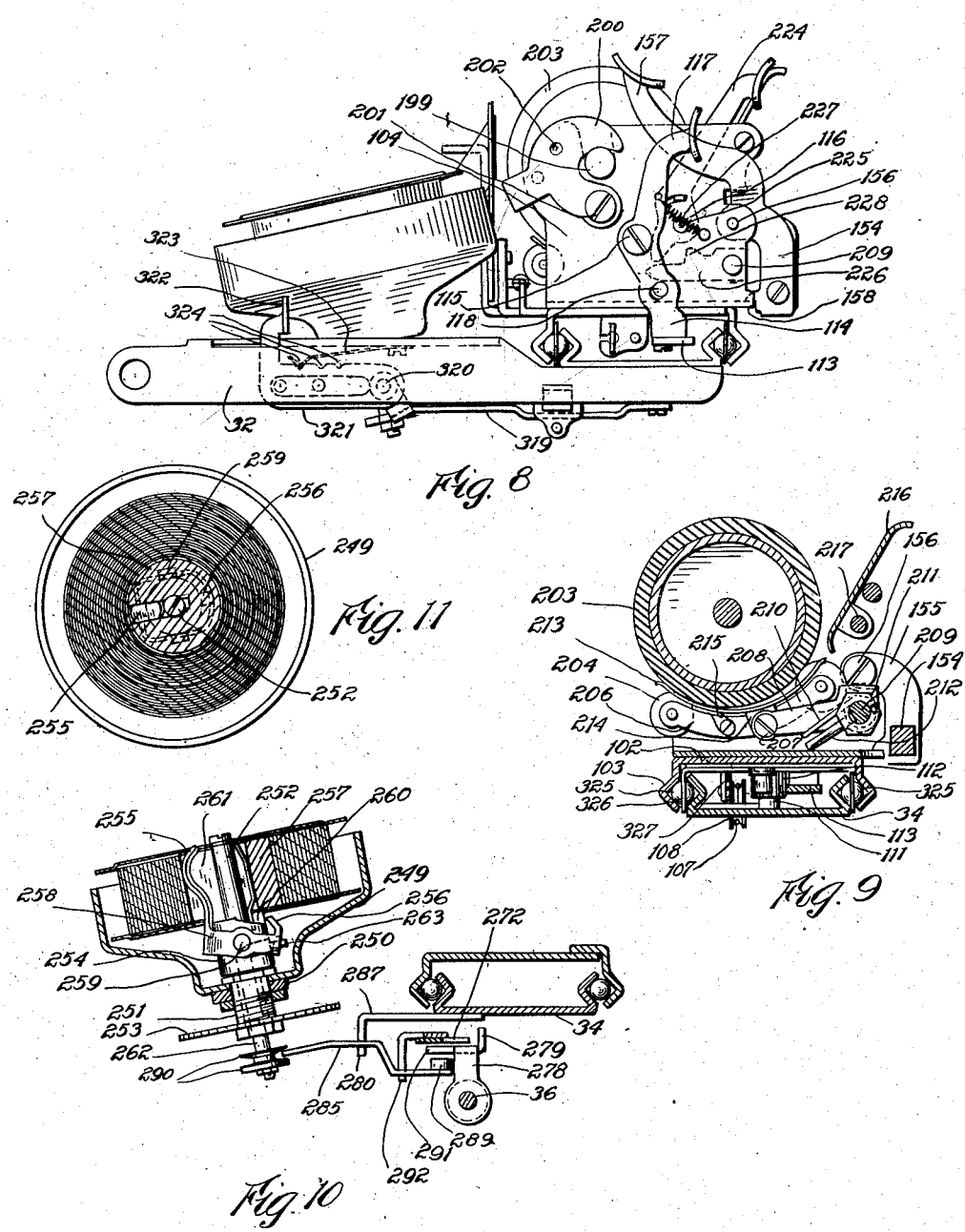

Jan. 5, 1926.

O. A. HOKANSON 1,568,736

TYPEWRITER

Filed June 6, 1924     9 Sheets-Sheet 6

Inventor
Otto A. Hokanson
By Nissen & Crane
Attys

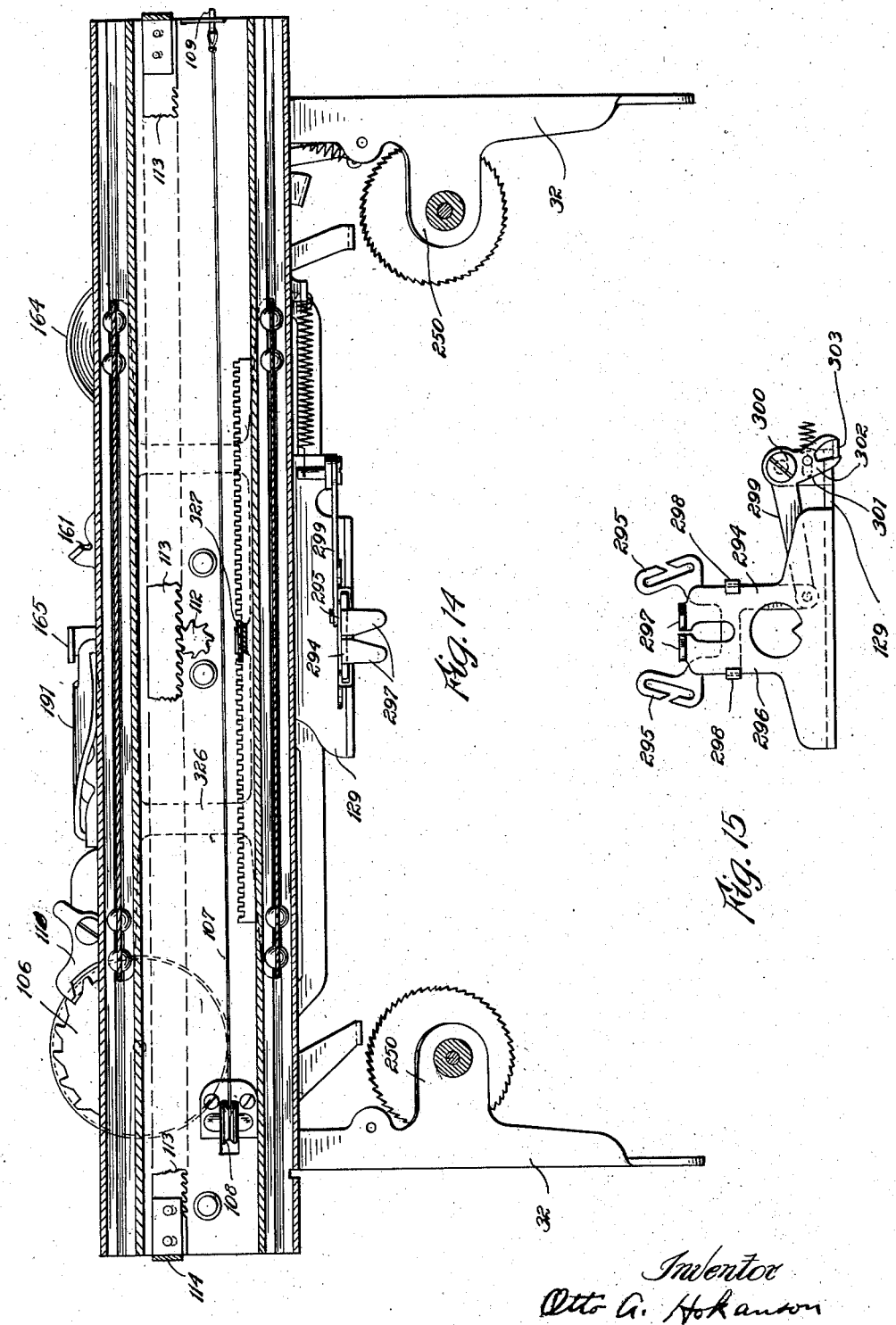

Jan. 5, 1926.
O. A. HOKANSON
TYPEWRITER
Filed June 6, 1924    9 Sheets-Sheet 8
1,568,736
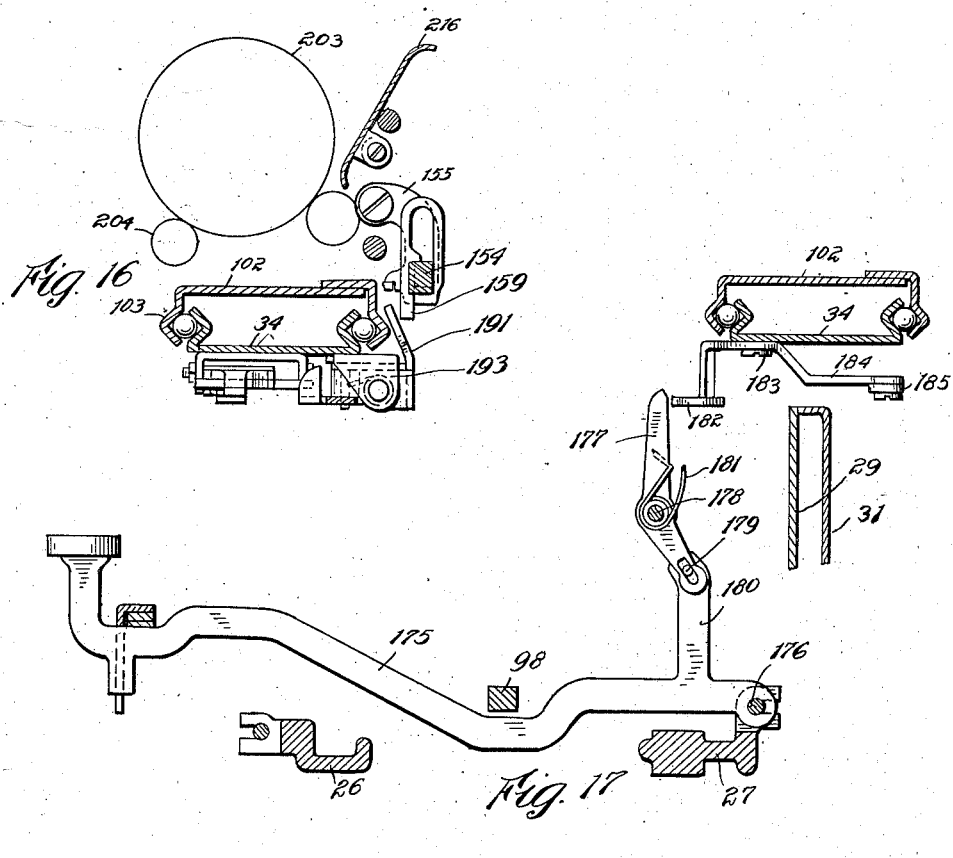
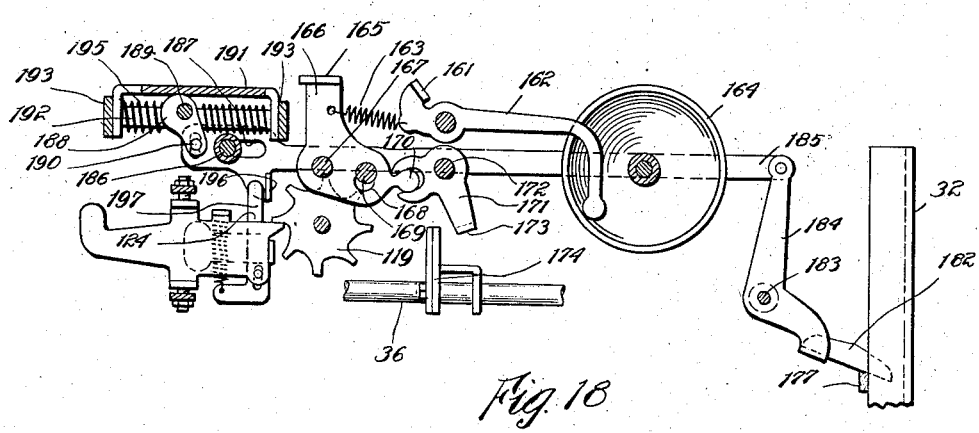
Inventor
Otto A. Hokanson
By Nissen & Crane Attys Jan. 5, 1926.
O. A. HOKANSON
1,568,736
TYPEWRITER
Filed June 6, 1924 9 Sheets-Sheet 9
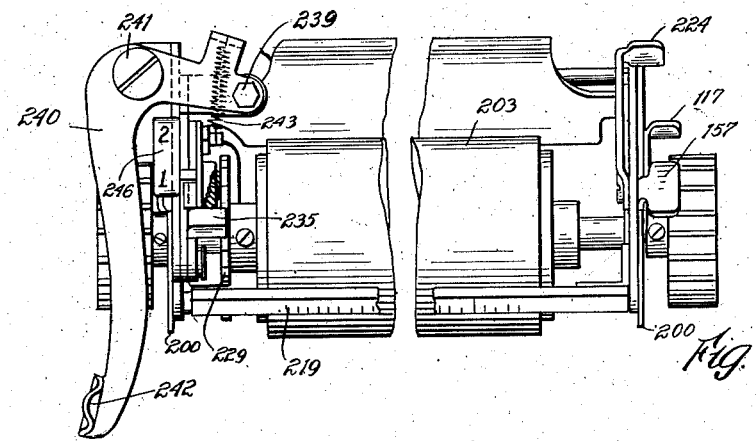
Fig. 19
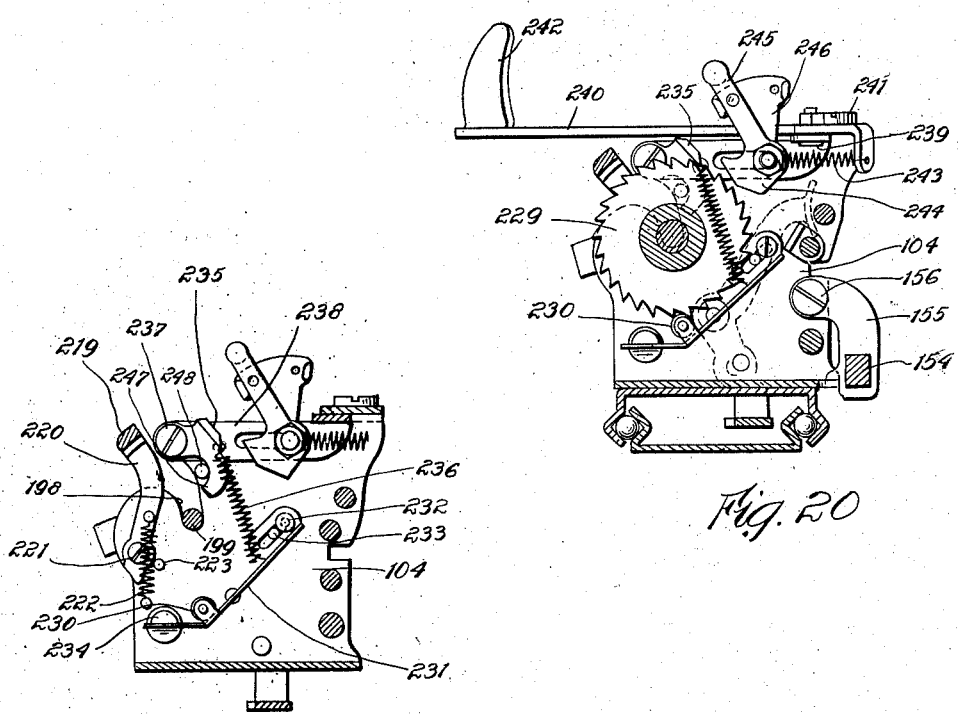
Fig. 20
Fig. 21
Inventor
Otto A. Hokanson
By Niesen & Crane Attys Patented Jan. 5, 1926.

1,568,736

UNITED STATES PATENT OFFICE.

OTTO A. HOKANSON, OF WOODSTOCK, ILLINOIS, ASSIGNOR TO WOODSTOCK TYPEWRITER COMPANY, OF WOODSTOCK, ILLINOIS, A CORPORATION OF ILLINOIS.

TYPEWRITER.

Application filed June 6, 1924. Serial No. 718,26

*To all whom it may concern:*

Be it known that I, OTTO A. HOKANSON, a citizen of the United States, residing at Woodstock, in the county of McHenry and State of Illinois, have invented certain new and useful Improvements in Typewriters, of which the following is a specification.

This invention relates to a portable typewriter and has for one of its objects the provision of such a device in which the platen and associated mechanism may be folded to a compacted position over the keyboard, there being a rock shaft in the main frame of the machine having means thereon which is automatically brought into operative relation with the mechanism associated with the platen when the platen is moved to its operative position.

A further object is to provide a portable typewriter having a standard keyboard which shall be of improved construction and operation.

The invention is exemplified in the combination and arrangement of parts shown in the accompanying drawings and described in the following specification, and it is more particularly pointed out in the appended claims.

In the drawings—

Fig. 3 is a vertical section adjacent the inner frame at one side of the type bar support showing the case shift mechanism;

Fig. 4 is a top plan view of the shift key;

Fig. 5 is a vertical section of the machine at the opposite side from that shown in Fig. 3 and showing the back spacing key;

Fig. 6 is a fragmentary view showing the shift lock;

Fig. 7 is a top plan view of the left-hand shift key and the back spacing key;

Fig. 8 is an elevation of the platen carriage frame;

Fig. 9 is a transverse section of the platen carriage frame;

Fig. 10 is a vertical section showing the automatic ribbon reverse mechanism;

Fig. 11 is a horizontal section showing the control mechanism for the automatic ribbon reverse;

Fig. 14 is a horizontal section taken along the platen carriage ways;

Fig. 15 is a front elevation of the ribbon vibrator;

Fig. 16 is a transverse section of the platen carriage frame showing the tabulator stop;

Fig. 17 is a somewhat diagrammatic vertical section showing the tabulating key;

Fig. 18 is a horizontal section showing the line lock and tabulator stop mechanism;

Fig. 19 is a top plan view of the platen carriage showing the line spacing lever;

Fig. 20 is a vertical section of the platen carriage showing the line spacing mechanism; and Fig. 21 is a vertical section of the platen carriage adjacent the left-hand end plate thereof.

Figure 1:
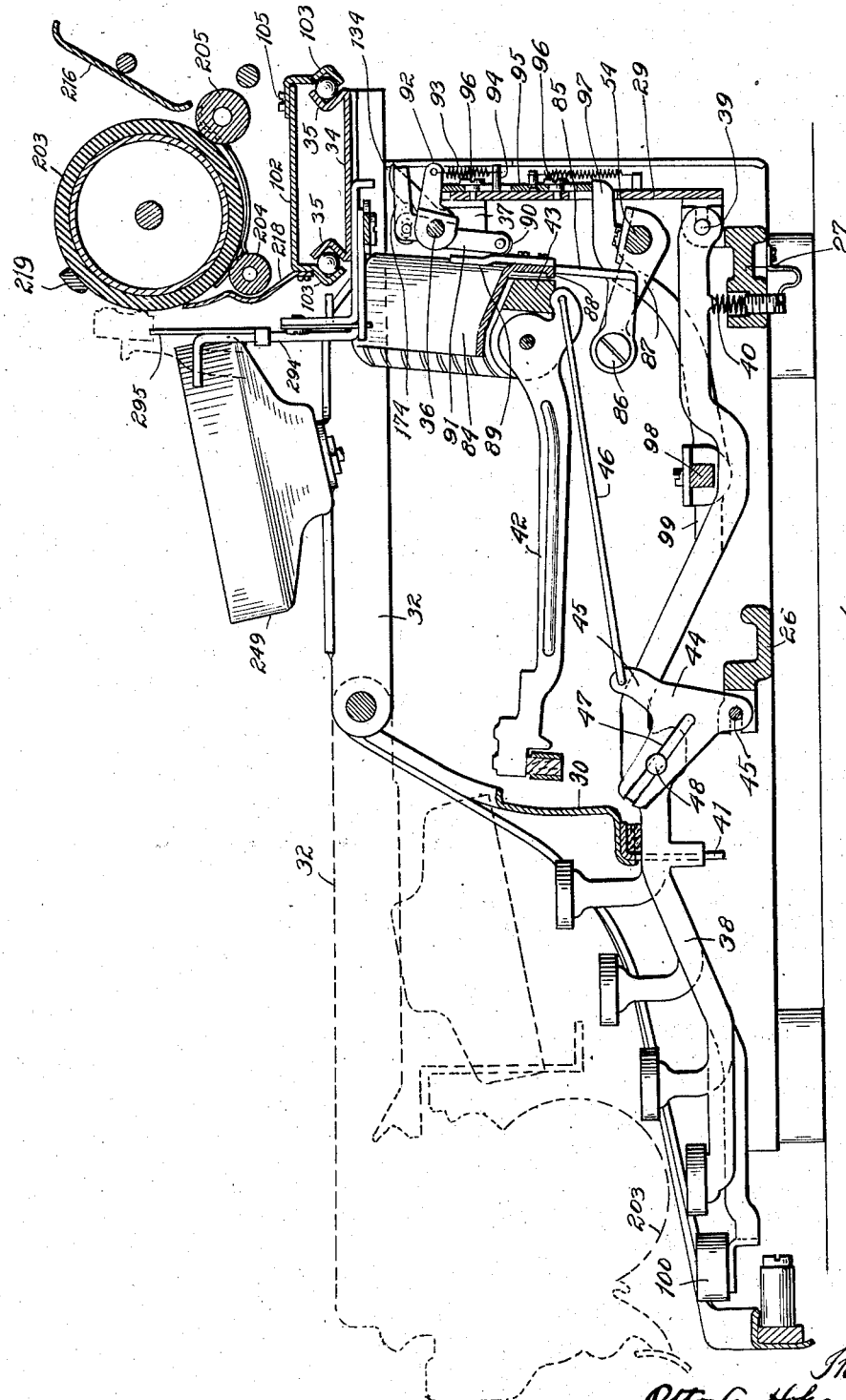
Fig. 1 is a central vertical section of a typewriter showing one embodiment of the present invention.

As shown in Figs. 1, 2, 3 and 5, the typewriter comprises an inner frame having a skeleton portion 25 provided with cross-bars 26 and 27 preferably of cast aluminum. A sheet metal frame having side plates 28, a rear plate 29, and a front plate 30 is mounted on the skeleton frame 25. An outer sheet metal casing 31 preferably encloses the inner skeleton frame and is secured to the inner frame in any suitable manner.

A pair of arms 32 are pivoted at 33 to the side plates 28 and to the outer frame 31 and the ends of these arms are connected by a bed plate 34 having ways 35 thereon upon which the platen carriage moves. The key levers and type bars are supported on the main frame 25 which also carries the main operating rock shaft 36 journaled in brackets 37 secured to the rear plate 29, the rock shaft being in position to cooperate with the operating parts of the platen carriage when the platen carriage is in its operative position shown in full lines in Fig. 1. The operative connection with the main rock shaft 36 is broken when the platen carriage is moved to its compacted position shown in broken lines in Fig. 1.

The key lever action is best illustrated in Fig 1 and comprises a plurality of key levers 38 pivoted at 39 on the cross-bar 27 and provided with springs 40 for supporting them in their uppermost position. The key levers are guided in their downward movement by a slotted comb 41 supported by the plate 30. The type bars 42 are pivoted in a type bar segment 43 to swing upwardly and rearwardly when the key levers are depressed. Sub-levers 44 are pivoted at 45 on the cross-bar 26 and are provided with slots 47 cooperating with pins 48 on the key levers 38. Each sub-lever 44 has an arm 45 connected with a type bar 42 by means of a link 46. The arms 45 vary in length to bring the links 46 into proper relation with the type bars 42 in their various positions on the segment 43. In order to compensate for the difference in length of the arms 45 the pins 48 vary in their position on the key levers 38 to bring them into different positions along the slot 47. In this way the proper amount of movement is imparted to each type bar for uniform movements of the keys.

For changing from one case to another the type bar segment 43 is shifted relative to the platen. For this purpose the segment is supported on pivoted links 49 and 50, the upper links 40 being pivotally mounted on the brackets 37 which support the main rock shaft 36. The forward ends of the arms 49 and 50 are pivoted at 51 and 52, respectively, to arms 53 connected to the type bar segment 43. The arms 50 are fixed to a shaft 54 which is journaled in brackets 55 supported on the plate 29.

A pair of springs 56 have their lower ends attached to pins 57 projecting from the pivotal supports 52, the upper ends of the springs being connected in fingers 58 projecting forwardly from the brackets 37. The fingers 58 are provided with a series of notches 59 along which the upper end of the spring 56 may be moved to adjust the tension of the spring. It will be seen that the segment 43 is held in its uppermost position by the springs 56, the upper position being determined by adjustable screws 60 threaded in the rear portion of the cross-bar 27 and engaging a plate 61 fixed to the shaft 54 by screws 62.

Each end of the shaft 54 is provided with a plate 61 and a key lever is located at each side of the machine for co-operating with the plate 61 to shift the type bar segment downwardly against the tension of the springs 56 to change from lower to upper case type. A right-hand shift key lever is shown at 63 in Fig. 4 of the drawings, the rear end of the lever being pivoted to the cross-bar 27 at 64. Intermediate its ends the key lever 63 is provided with a pair of slots 65 to which is adjustably secured a rearwardly extending arm 66. The rear end of the arm 66 carries a pin 67 which operates in a slot 68 in a lever 69. The lever 69 is pivoted at 70 to the cross-bar 26 and the rear end of the lever is provided with a downwardly projecting head 71 which bears upon the front end of the plate 61.

When the shift lever is depressed the type bar segment will be moved downwardly by the lever 69 and plate 61 to bring the upper case type into registration with the writing line. The extent of downward movement is limited by a pair of screws 72 threaded in the cross-bar 27 to provide adjustable stops for the case shift mechanism. The left-hand shift key is preferably provided with a shift lock 73 shown in Figs. 5, 6 and 7. This shift lock is pivoted at 74 on the shift key 63 and has a contact shoulder 75 for engaging a stop 76 secured to the side plate 28. The stop 76 is carried by a bracket 77 having slots 78 therein for receiving screws 79 by means of which the stop is adjustably connected to the side plate. A spring 80 connects the catch shoulder 75 with an ear 81 on the shift lever 63 and normally holds the shift lock in its retracted position. When the operator presses the shift lock the tension of the spring 80 is overcome and the shift key is moved downwardly and at the same time the shoulder 75 is moved beneath the catch 76 to lock the shift key in its depressed position. When it is desired to release the shift key this key is itself depressed a slight amount to release the shoulder 75 from the stop 76 whereupon the spring 80 will withdraw the shoulder from the stop and permit the shift key to return to its upper position.

The type bar segment 43 is provided with forwardly extending arms 82 which carry an arcuate type bar rest 83 at their forward ends. Concentric with the type bar segment 43 is an arcuate universal bar 84 supported by downwardly extending arms 85 pivotally connected at 86 to arms 87 fixed on the rock shaft 54 and projecting forwardly therefrom, as shown in Fig. 1. The pivots 86 are in axial alinement with the pivotal supports 57 for the type bar segment 43. It will be seen that the universal bar 84 will be shifted with the type bar segment and remain in fixed relation to the segment for the different case positions thereon. The universal bar 84 is provided with stops 88 which engage the rear of the segment 43 to limit the forward movement of the bar. The front edge of the bar is positioned in the path of the type bars 42 so the universal bar 84 is struck by a type bar when a type key is depressed and the action of the type bar moves the universal bar rearwardly. A contact member 89 is secured to the universal bar 84 near the center thereof and projects upwardly into position to engage a roller 90. The contact member 89 is of sufficient length to bear upon the roller 90 for both case positions.

The roller 90 is supported on an arm 91 projecting downwardly from the rock shaft 36 and rigidly fixed thereto. Also fixed to the shaft 36 is a rearwardly extending finger 92 to the rear end of which is attached a spring 93. The spring 93 has its lower end secured to a pin 94 projecting rearwardly from the plate 29. In this way the roller 90 is resiliently held against the contact member 89 and the universal bar 84 is in turn resiliently pressed forwardly against the segment 43. Each operation of a type bar moves the roller 90 rearwardly oscillating the rock shaft 36 against the tension of the spring 93. The rock shaft 36 may also be oscillated by means of a bar 95 slidably mounted on the rear of the plate 29 and held in place by screws 96. The upper end of the bar 95 engages the lower edge of the finger 92 and the lower end of the bar rests upon the rear end of an arm 97 centrally attached to a shaft 98 extending transversely of the machine frame and pivoted therein. Spacing levers 99 are also secured to the shaft 98 and extend forwardly therefrom at opposite sides of the machine frame, the forward ends of the levers 99 being connected by a space bar 100 at the front of the keyboard. By this mechanism the shaft 36 may be oscillated by the spacing bar 100 independently of the operation of the type bars. As will be explained later, the escapement mechanism is operated by the shaft 36 at each oscillation thereof to impart a letter space movement to the platen. A spring 101, Fig. 5, is secured to the shaft 98 and supports the space bar and levers in their uppermost positions.

The platen carriage comprises a base plate 102 having ways 103 cooperating with the ways 35 on the plate 34. Upright plates 104 are provided at the opposite ends of the base plate 102 to provide supports for the platen. The plate 102 is made in two sections adjustably held together by bolts 105 to permit the ways 103 to be adjusted relative to one another. A spring drum 106 is mounted on the under side of the plate 34 and a cord 107 extends from the drum 106 about a pulley 108 journaled on the plate 34. The end of the cord 107 is attached to the carriage plate 102, as shown at 109 in Fig. 14. An escapement dog 110 is provided for regulating the tension in the spring drum 106. The platen carriage is thus resiliently drawn to the left by the spring drum and cord in a manner common in the art.

To control the movement of the platen carriage an escapement shaft 111 is journaled in the frame plate 34 and provided with a pinion 112 which meshes with a rack 113. The rack 113 is carried by arms 114 pivoted at 115 on the end plates 104, as shown in Fig. 8. Springs 116 hold the rack 113 in engagement with the pinion 112 and a finger piece 117 is provided for moving the arm 114 to carry the rack out of engagement with its pinion when desired. A stop pin 118 controls the amount of movement of the lever 114.

Figure 12:
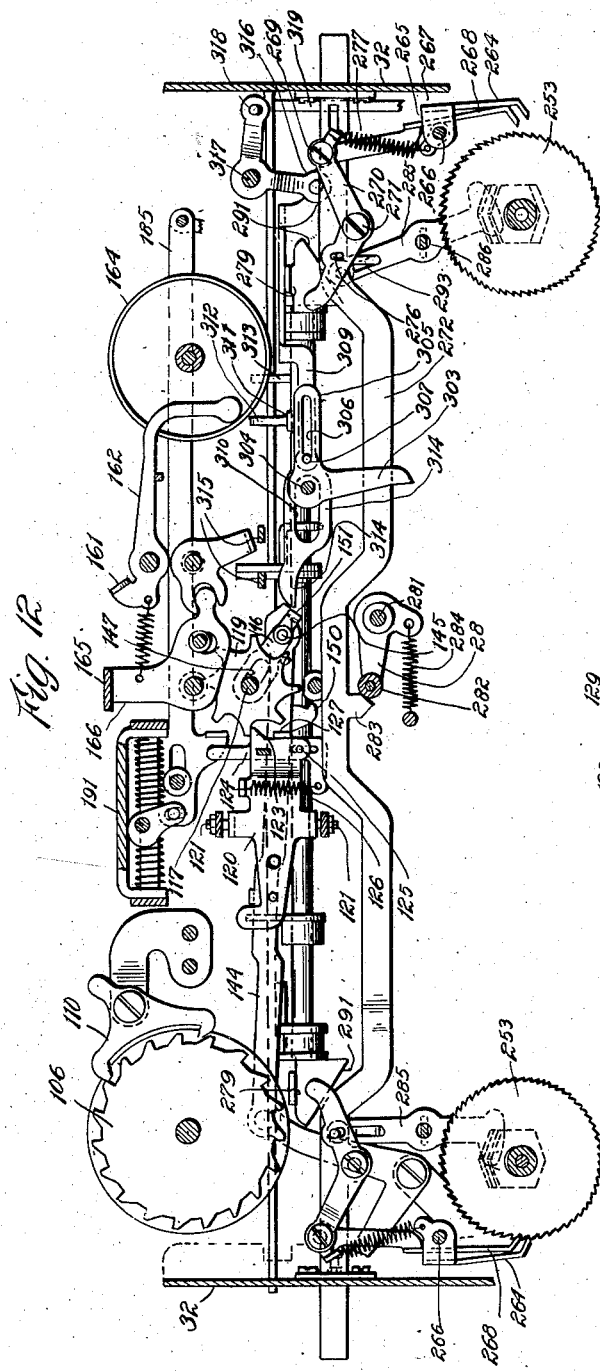
Fig. 12 is a horizontal section of the platen carriage frame showing the operating mechanism carried thereby in plan view.
Figure 13:
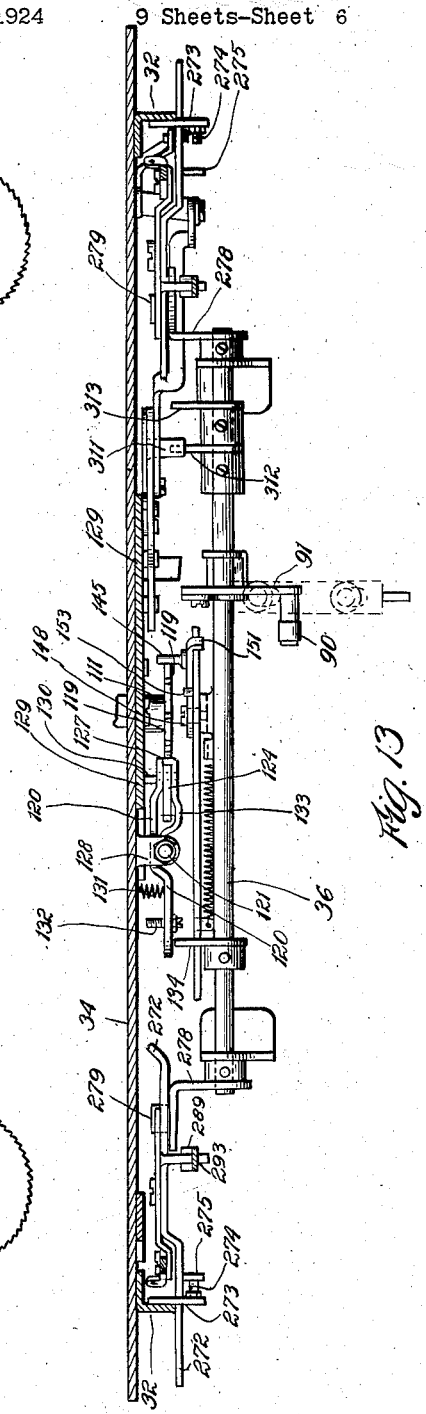
Fig. 13 is a vertical section showing the mechanism illustrated in Fig. 12.

The lower end of the shaft 111 carries an escapement wheel 119, as shown in Figs. 12 and 13. The escapement wheel 119 is controlled by a dog rocker 120 pivoted at 121 to the lower face of a plate 129. A fixed dog 123 is formed on the dog rocker 120 and a movable dog 124 is slidably and pivotally mounted on the dog rocker at 125. A spring 126 holds the dog against a stop 127 and urges it toward the teeth of the escapement wheel 119. As the dog rocker 120 is oscillated upon its pivots the teeth of the escapement wheel 119 alternately engage the fixed and movable dogs 123 and 124, respectively, and at each oscillation the escapement wheel is permitted to rotate an angular amount corresponding to the spacing of one tooth.

The pivots 121 are supported by ears 128 extending downwardly from a plate 129 secured to the lower face of the plate 34. The plate 129 has a lug 130 struck downwardly therefrom to provide a limit stop for the oscillation of the dog rocker 120 in one direction. A spring 131 normally holds the dog rocker against the stop 130. A screw 132 forms a stop for limiting the movement of the dog rocker in the opposite direction. An arm 133 is secured to the lower face of the dog rocker 120 and provides a guide for the lower face of the movable dog 124, as shown in Fig. 13. The limit stop 127 is carried by the guard arm 133. Oscillation of the dog rocker 120 is produced by a finger 134 carried on the rock shaft 36. It will thus be seen that each time the rock shaft 36 is oscillated either by a type key or by the space bar the dog rocker 120 will be oscillated to permit rotation of the escapement wheel 119, thus allowing a letter space movement of the platen carriage. It will be apparent that folding of the platen carriage merely lifts the dog rocker 120 away from its operating finger 134 and that return of the platen carriage to its operative position automatically restores the dog rocker 120 into operative relation with the finger 134 on the rock shaft 36.

For back spacing the platen carriage a key lever 135 is pivoted at 136 in alinement with the pivot 39 for the type keys and is provided with a spring 40 similar to that of the type keys for holding it in its uppermost position. An arm 137 projects upwardly from the key lever 135 and is guided by a bifurcated projection 138 extending forwardly from the plate 29. The upper end of the arm 137 is positioned in the rear of one arm 139 of a bell crank lever pivoted at 140 on a bracket 141 extending inwardly from the side plate 28. The other arm 142 of the bell crank lever is pivotally connected at 143 to a link 144. The link 144, as shown in Figs. 12 and 13, extends toward the center of the machine and its inner end is pivotally connected at 145 through an arm 146 having a slot 147 therein for engaging a stud 148 in alinement with the axis of the escapement wheel 119.

The stud 148 is carried on a projection 149 on the back plate 29. The back plate 29 also carries a projection 150 for engaging an ear 151 at the end of the arm 146 to limit the rotation of the arm about the stud 148. A spring 152 normally draws the link 144 to the right, as viewed in Figs. 12 and 13. The pivotal connection 145 is provided with an upwardly projecting pin which extends into the plane of the escapement wheel 119. A stop 153 is formed on the link 144 in position to engage the arm 146 and limits the movement of the arm to the right under the influence of the spring 152. When the back space key is depressed the first effect is to move the arm 146 radially along the slot 147 until the end of the slot strikes the stud 148. This will bring the pin 145 into engagement with a tooth on the escapement wheel 119. Further movement of the link 144 will cause the arm 146 to rotate about the stud 148 and thus turn the escapement wheel 119 in a reverse direction to effect a back space movement of the platen carriage. The escapement wheel will be caught and held in the position to which it is turned by the back space mechanism by means of the escapement dogs. It will be seen that the entire back spacing mechanism is carried on the main frame of the machine and is not affected by folding operation of the platen carriage. When the platen carriage is moved to its operative position the escapement wheel assumes a position adjacent the pin 145 so that upon depression of the back space key the pin is brought into engagement with the escapement wheel.

Figure 2:
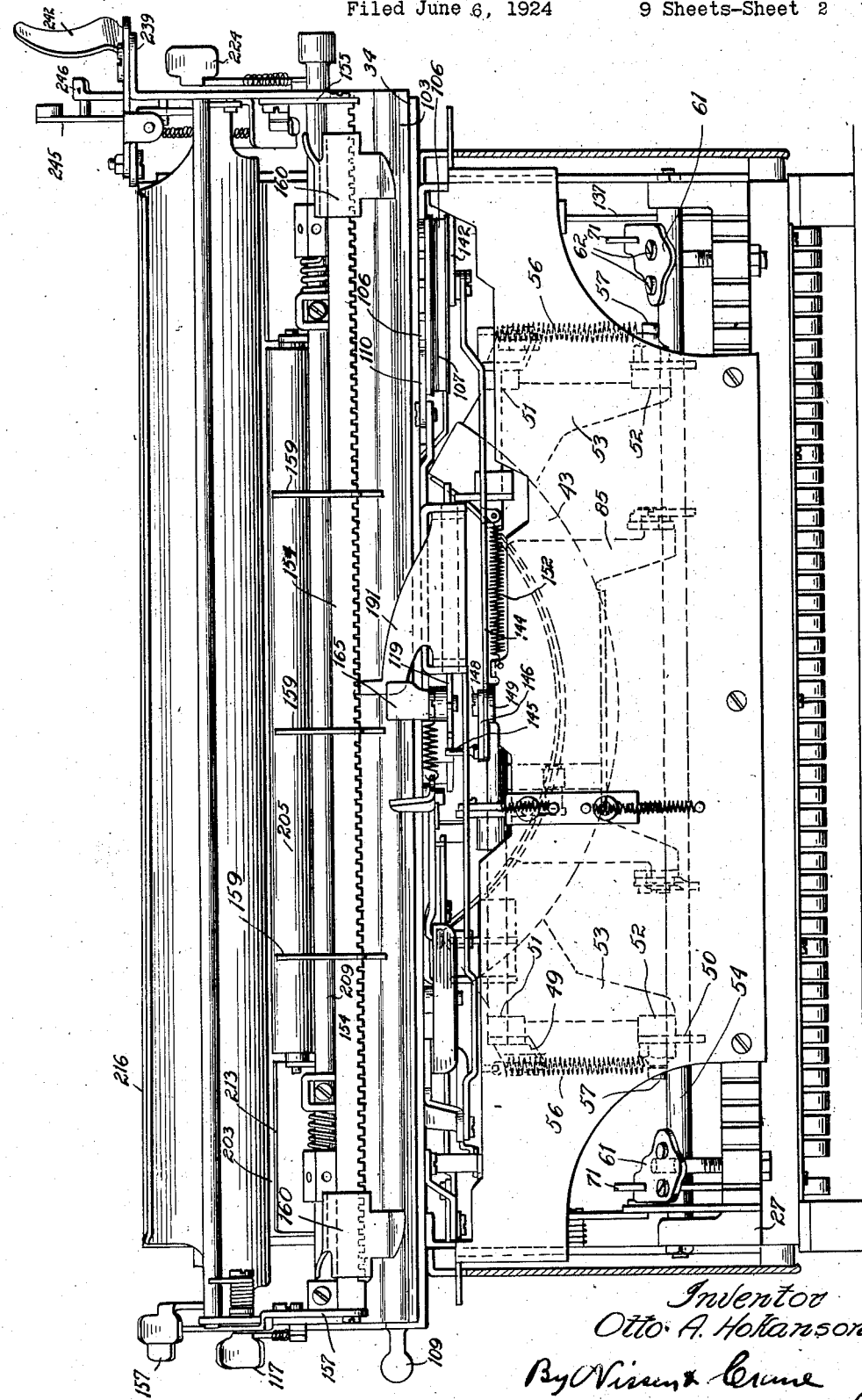
Fig. 2 is a rear view of the machine shown in Fig. 1.

A stop bar 154 is carried by arms 155 pivoted at 156 to the end plates 104. The arm 155 at the right-hand side of the machine is continued upwardly to provide a finger piece 157 by means of which the stop bar 154 may be swung rearwardly. The forward movement of the stop bar is limited by a shoulder 158 which engages the end plate 104. The bar 154, as shown in Fig. 2, is provided with adjustable tabulator stops 159 and with margin stops 160. During a writing operation as the carriage approaches the end of a line the margin stop 160 at the left, as viewed in Fig. 2, will engage an inclined contact member 161, Fig. 18. The contact member 161 is mounted on one end of a bell tapper 162 which is controlled by a spring 163. The movement of the stop 160 past the contact member 161 will move the tapper 162 away from the bell 164 and when the stop has passed the contact member 161 the spring 163 will cause the taper to strike the bell to apprise the operator that the end of the line is about reached. Further movement of the carriage will bring the margin stop into engagement with a central stop member 165. This stop member is carried on a bell crank lever 166 pivoted at 167 on the lower side of the base plate 34. Contact with the stop 165 will move the bell crank lever about its pivot an amount limited by a slot 168 and a pin 169. The end of the bell crank lever opposite the stop 165 has a pivotal and sliding engagement at 170 with a second bell crank 171 pivoted at 172 to the base plate 34.

The bell crank 171 has a downwardly projecting finger 173 which upon movement of the bell crank 166 is swung into position above an arm 174 secured to the main rock shaft 36. In this way the rock shaft 36 will be locked against oscillation and this in turn will lock the universal bar 84 against rearward movement and prevent the type bars from striking the platen. This will also prevent operation of the escapement mechanism since the escapement mechanism is actuated by the rock shaft 36. If it should be desired to write in the margin after operation of the line lock mechanism this may be done by swinging the stop bar 154 rearwardly by means of the hand lever 157 to permit the margin stop 160 to clear the central stop member 165. The reverse side of the margin stop 160 is provided with a beveled face for engaging the stop 165 on the return movement of the carriage so that the bar 154 will be automatically moved rearwardly to prevent the stops to pass one another. The movement of the carriage to the right is limited by the other margin stop 160 which engages the opposite side of the stop 165. This does not effect a line lock but arrests the movement of the carriage while permitting the operating mechanism to remain in its operative relation. The bar 154 may be swung rearwardly to permit writing in the left-hand margin, as well as in the right-hand margin.

A tabulator key lever 175, Fig. 17, is pivoted at 176 in pivotal alinement with the type keys, the lever being arranged adjacent the right-hand side plate 28 of the typewriter frame. A second lever 177 is pivoted at 178 on the side plate of the frame and has a pin and slot connection 179 with an upstanding arm 180 on the lever 175. A spring 181 normally moves the upper portion of the lever 177 forwardly and retains the lever 175 in its uppermost position. The upper end of the lever 177 is positioned in front of one arm 182 of a bell crank lever pivoted at 183 on the lower face of the bed plate 34. The other arm 184 of the bell crank lever is pivoted to a slide bar 185. The opposite end of the slide bar 185 is supported on a pin 186 extending downwardly from the plate 34 and is provided with a slot 187 to permit longitudinal movement of the bar. A cam lever 188 is pivoted at 189 on the lower face of the plate 34 and has a pin and slot connection 190 with the slide bar 185.

A tabulator stop plate 191 is pivoted on a bar 192 supported by ears 193 extending downwardly from the plate 34. A spring 195 normally holds the upper end of the stop plate 191 in a forward position out of the path of movement of the tabulator stops 159. When the tabulator key is depressed the stop plate 191 is moved rearwardly by the cam 188 into the path of the tabulator stops. The bar 185 is provided with a lug 196 arranged adjacent a trip finger 197 on the loose dog 124. The movement of the bar 185 will swing the loose dog out of engagement with the escapement wheel 119 and permit the carriage to move freely under the influence of the spring drum 106 until a tabulator stop strikes the stop plate 191. The parts are so timed that the carriage will not be released until the stop plate 191 is in position to arrest its movement. When the tabulator key is released the loose dog 124 will be returned into position to engage the teeth of the escapement wheel prior to the release of the carriage on the stop plate 191. The stops 159 may be arranged in various positions along the bar 154 and any number of tabulator stops desired may be employed.

The end plates 104 of the platen carriage are provided with upwardly open notches 198 in which the platen shaft 199 is seated. Retainer hooks 200 are pivoted at 201 on the side plates 104 for holding the shaft 199 in position in their seats. Each hook may be provided with a projection 202 on its inner face which engages suitable depressions in the side walls 104 to hold the retainer hooks either in an operative or in an inoperative position. It will be apparent that this will permit ready removal of the platen 203 when desired.

The paper is held in position against the platen by paper feeding and guiding mechanism comprising a pair of rollers 204 and 205. The ends of the rollers are journaled in rocker arms 206 which are pivotally mounted at 207 on a pair of arms 208 fixed to a shaft 209 having its ends journaled in the side plates 104. A spring 210 has one end arranged to bear upwardly on the arm 208 while the other end is fixed to a hexagonal collar 211 mounted to rotate on the shaft 209. The collar 211 may be turned on the shaft 209 to properly tension the spring 210 and is held in its angular position by a pin 212 which may be inserted into the openings in the periphery of the collar 211 at various angular positions. In this way the rollers 204 and 205 are resiliently pressed against the periphery of the platen 203. A deflector plate 213 is provided with ears 214 engaging the pivots 207 and a spring 215 holds the forward edge of the plate 213 against the periphery of the platen. A paper table 216 is pivoted at 217 on the platen carriage for directing the front edge of the paper between the platen 203 and the roller 205. A supplemental spring plate 218 may be secured to the front edge of the platen carriage 102, as shown in Fig. 1, to assist in holding the paper in position adjacent the printing line.

A paper bail 219 preferably is arranged longitudinally of the platen above the printing line and is supported on arms 220, Fig. 21. The arms 220 are pivoted at 221 on the end plates 104 and are provided with springs 222 which normally press the bail 219 against the front face of the platen. If the bail is brought forwardly, however, until the axis of the spring 222 passes the pivotal center 221 the spring 222 will act to retain the bail 219 in a forward inoperative position to permit the front edge of the paper to be directed upwardly between the bail and platen. A stop 223 is provided for limiting the forward movement of the bail 219.

The paper feed rollers 204 and 205 may be released from engagement with the platen by means of a lever 224 pivoted at 225 on the plate 104, as shown in Fig. 8. The lower end of the lever 224 engages an arm 226 secured to the shaft 209. A spring 227 normally holds the lever 224 out of engagement with the arm 226, but when the lever 224 is drawn forwardly it will press the arm 226 down and thus rotate the shaft 209 to release the paper feed rollers. The contact portion of the lever 224 will pass dead-center when the lever is moved forwardly and will be arrested by a stop 228 on the arm 226 so that the feed rollers will be held out of operative position until the lever is returned.

A line spacing ratchet wheel 229 is secured to the left-hand end of the platen shaft adjacent the end plate 104 and is provided with a detent roll 230 to yieldingly hold it in various positions of rotation. The roll 230 is carried on a spring 231 adjustably secured to the end plate 104 by a screw 232 and pin 233. An eccentric button 234 is journaled in the end plate 104 and is provided with a thumb piece at the outer face of the frame plate for moving the roll 230 out of engagement with the ratchet wheel 229. The ratchet wheel is rotated for line spacing by a pawl 235 having a spring 236 to hold it against the ratchet wheel. The pawl is pivoted at 237 on a link 238, the opposite end of which is pivoted at 239 to the carriage return member 240. This lever is mounted at 241 on the platen carriage and is provided with a handpiece 242 by means of which the carriage is returned after a line is completed and at the same time the lever is oscillated to move the pawl 235 rearwardly and rotate the platen. A spring 243 returns the lever 240 to its position when it is released.

The amount of rotation of the platen is controlled by a member 244 having two stop faces thereon for engaging the pawl 235 and arresting its movement at different positions. The stop member 244 may be shifted by a hand lever 245. A stop segment 246 is provided with means for holding the lever 245 in its adjusted positions. The amount of movement of the pawl 235 is controlled by the stop member 244 which arrests the pawl at the end of its movement. One position of the lever 245 will permit double spacing of the platen, while the other position arrests the pawl after a single space movement. The pawl is provided with a tailpiece 247 which engages a pin 248 to throw the pawl out of engagement with the ratchet wheel 229 when it is returned to its inactive position.

A pair of ribbon spool holders 249 are mounted on brackets 250, there being one bracket on each of the arms 232. A bushing 251 is fixed in the bracket 250 and is provided with a shaft 252 journaled therein. A ratchet wheel 253 is fixed to the lower end of the shaft 252 and the shaft is provided with an enlarged portion 254 within the casing 249. A control finger 255 is pivoted on the enlargement 254 and is provided with a contact member 256 for engaging a spring 257 secured to the upper end of the shaft 252. The finger 255 and the contact member 256 are both mounted on a yoke 258 surrounding the enlargement 254 and pivoted at 259 thereon. A slot 260 is provided in the enlargement 254 to permit movement of the spring 257 and contact member 256 and when the ribbon spool is removed from the shaft 252 the spring 257 normally holds the contact member 256 and the finger 255 in the position shown in Fig. 11. When the ribbon spool is in place, however, as shown in this figure, the spring 257 is depressed and the finger 255 is held in the position shown by the ribbon wound upon the spool. The spool is provided with a slot 261 to permit free pivotal movement of the finger 255 so that when all of the ribbon has become unwound the finger will drop outwardly and downwardly away from the shaft 252.

A slide rod 262 passes through the lower portion of the shaft 252 and is provided with a lateral projection 263 at its upper end which moves in a slot in the enlargement 254. When the finger 255 is released by the ribbon on the spool the projection 263 is lifted by engagement with the yoke 258. If at any time the spool is removed from the shaft the spring 257 will return the finger 255 to its upper inner position so that it will readily enter the slot 261 of the spool when the spool is replaced. Movement of the slide rod 262 effects an automatic reverse operation of the ribbon feed mechanism, as will be explained.

The ribbon feed mechanism comprises operating pawls for the ratchet wheels 253 located at opposite sides of the platen support, as shown in Fig. 12. Detent pawls 264 are provided with spaced ears 265 which are pivotally mounted at 266 on flanges 267 formed on the arms 32. Operating pawls 268 are pivotally mounted at 269 on levers 270, the levers 270 being pivoted at 271 on a slide bar 272. The bar 272 is mounted to slide in slots formed in brackets 273 which depend from the arms 32. Stop screws 274 cooperate with lugs 275 on the bar 272 to limit the movement of the slide bar. A pin and slot 276 limit the pivotal movement of the lever 270 on the bar 272. A spring 277 joins projecting lugs on the pawls 264 and 268, respectively, and operates to draw both pawls toward the ratchet wheel 253.

At each end of the main rock shaft 36 there is provided a bracket 278 having an upwardly projecting flange 279 thereon arranged in registration with the end of the lever 270 opposite the pivotal connection 269. When the rock shaft 36 is oscillated the flange 279 engages the end of the lever 270 and moves the pawl 268 forwardly to impart rotation to the ratchet wheel 253. The ratchet wheel is retained in its rotated position by the holding pawl 264. It will be apparent that in one position of the slide bar 272 the pawls at one side of the carriage will be in operative engagement with the ratchet wheel 253, while the pawls at the opposite side will be thrown out of engagement because of the pivotal movement imparted to the actuating pawl 268 about the pivot 266. When the bar 272 is slid in the opposite direction the position of the pawls will be reversed.

A bell crank lever 280 is pivoted at 281 on the lower face of the bracket 129 and carries a roller 282 which engages a beveled projection 283 on the slide rod 272 and holds the rod in either one or the other of its positions of adjustment. A spring 284 presses the roller 282 into engagement with the beveled faces of the projection 283. It will be apparent that the direction of feeding movement of the ribbon may be reversed by sliding the rod 272 in either one or the other direction. This reversal may be accomplished by hand, but automatic means for reversing the ribbon feeding mechanism controlled by the rod 262 is also provided. This automatic means comprises a lever 285 supported on a T-head 286 for pivotal movement both horizontally and vertically. The T- head 286 is carried by a bracket 287, Fig. 10, the bracket being secured to the bed plate 34 of the platen carriage support. The lever 285 carries a roller 289 at one end and at the opposite end the lever projects between flanges 290 formed on the lower end of the slide 262. When the slide is lowered due to the complete unwinding of the ribbon from the ribbon spool the roller 289 will be raised until it registers with an inclined face 291 formed on bracket 278. When this occurs the next oscillation of the main rock shaft 36 will cause the inclined face 291 to engage the roller 289 and rotate the lever 285 in a horizontal direction about its support 286. The slide bar 272 has a finger 292 projecting downwardly therefrom and engaging a slot 293 in the lever 285. When the lever 285 is moved by the cam face 291 it will carry the bar 272 in an endwise direction so as to bring the central portion of the lug 283 past the roller 282 and thus effect a reversal of the operating pawls for the ribbon spools.

The ribbon is guided at the printing point by a vibrator 294 having loops 295, Fig. 15, through which the ribbon is threaded. The vibrator is supported to slide vertically upon a plate 296 bent upwardly from the plate 129 secured to the lower face of the bed plate 34. The upper end of the guide 296 carries a pair of ears 297 constituting a type bar guide for directing the type at the printing point. The vibrator 294 is provided with lugs 298 bent around the edge of the guide 296 to hold the vibrator in position in its vertical movement. A lever 299 is pivoted at 300 on an ear 301 bent upwardly from the plate 129. The lever 129 is provided with a downwardly projecting finger 302 which engages the forwardly extending arm 303 of a bell crank lever pivoted at 304 on the lower face of the plate 129, Figs. 12 and 13. The other arm 305 of the bell crank lever is slotted at 306 to receive a pin 307 which pivotally connects a slide 308 with a longitudinally movable link 309. The slide 308 is provided with a slot 310 which engages an enlarged portion of the pivot 34. It will thus be seen that the slide 308 is constrained to move with the lever 303 about the pivot 304, but is free to slide in a longitudinal direction relative to the lever 303.

The slide 308 carries a contact lug 311 which may be moved into registration with either one of two fingers 312 and 313 which project upwardly from the universal rock shaft 36. At each oscillation of the rock shaft the finger 312 or 313 will move the slide 308 about the pivot 307 and consequently oscillate the lever 303 and raise the ribbon vibrator into position opposite the printing point. If the contact lug 311 is in registration with the finger 312 a greater movement will be imparted to the ribbon than will be the case if the lug 311 is in registration with the finger 313. This permits the vibrator to be set so as to operate either on the lower or upper portion of the ribbon. The ribbon may be provided with different color zones at its top and bottom so that the writing may be changed from one color to another.

The slide 308 is provided with a stop portion 314 which engages one or the other of a pair of stops 315 projecting downwardly from the plate 129, the stop engaged depending upon the position of the slot. The slide is moved by the link 309 which is pivotally connected at 316 to a bell crank lever pivotally mounted at 317 on the lower face of the bed plate 34. The other arm of the bell crank lever is pivoted at 318 to a link 319 which projects forwardly along the arm 32. The forward end of the link 319, as shown in Fig. 8, is pivoted at 320 to a slide 321 mounted on the arm 32 and provided with a finger piece 322 by which the slide may be moved back and forth to shift the link 39 and consequently set the ribbon vibrator for operating in either one of the two color zones. A spring 323 engages notches 324 in the slide 321 to hold the vibrator mechanism in its different positions of adjustment. When the spring 323 engages the central notch the contact member 311 will be positioned midway between the fingers 312 so that operation of the universal shaft 36 will not affect the ribbon vibrator. This position may be used when it is desired to operate the type bars without striking the ribbon, as for instance, to prepare a stencil.

As shown in Figs. 9 and 14, anti-friction balls 325 are interposed between the ways 35 and 103 and are held in position by a ball retainer 326. A pinion 327 is journaled on the ball retainer 326 and engages oppositely disposed racks, one of which is located on the lower face of the plate 102 and the other of which is located on the upper face of the plate 34. In this way the ball retainer 326 is caused to travel on the plate 34 at a rate equal to half that of the platen carriage. This prevents displacement of the balls 325. When the platen carriage is in its operative position it is locked from upward movement by a hook 328 pivoted at 329 on one of the arms 32, as shown in Fig. 5. The hook 328 engages a pin 330 on the side plate 28. A finger piece 331 is provided for releasing the hook. A positioning lug 332 is formed on the hook 328 in position to strike the way 103 when the hook is moved to disengage the pin 330. The way 103 has a notch cut therein to permit disengagement of the hook 328 when the carriage is in central position on the frame plate 34. This will lock the carriage in central position when the frame is folded and will prevent folding of the frame when the carriage is displaced in either direction from its central position. As soon as the carriage frame is in its operating position and the hook moved to engage the pin 330 the carriage will be released for travel along the frame 34.

It will be seen that a typewriter is provided which is of very compact construction and which may be folded into small space for transportation. Notwithstanding the compact arrangement the machine has all of the functions of the standard typewriter and the presence of the universal rock shaft 36ᵃ makes it possible to operate the parts for controlling the carriage, paper and ribbon from the key levers mounted in the main frame while the said operating parts are supported on the foldable frame and move readily into and out of operative relation with the universal rock shaft when the platen carriage is folded.

I claim:—

1. In a typewriting machine, a main frame, a platen carriage frame mounted on said main frame and movable into and out of operative position, a rock shaft journaled on a fixed axis in said main frame, operative mechanism mounted on said platen carriage frame, and means fixed on said rock shaft and operated thereby for cooperating with said operative mechanism to actuate the same when said platen carriage frame is in operative position but disconnectible therefrom when said platen carriage frame is moved to inoperative position.

2. In a typewriting machine, a main frame, a platen carriage frame foldably mounted on said main frame, a rock shaft journaled on a fixed axis in said main frame, a universal bar for oscillating said rock shaft, operating mechanism mounted on said platen carriage frame, and means on said rock shaft for actuating said operating mechanism.

3. In a typewriting machine, a main frame, type bars pivoted in said main frame, a platen carriage frame movably mounted on said main frame, a universal bar mounted in said main frame and operative by said type bars, a rock shaft journaled in said main frame, operating mechanism mounted on said platen carriage frame, and means on said rock shaft for actuating said operating mechanism, said rock shaft being actuated by said universal bar.

4. In a typewriting machine, a main frame having key levers and type bars mounted therein, a universal bar mounted in said main frame and actuated by said type bars, a universal rock shaft journaled on a fixed axis in said main frame, a platen carriage frame mounted on said main frame for movement into and out of operative position, escapement mechanism on said platen carriage frame, and means on said universal rock shaft for actuating said escapement mechanism when said platen carriage frame is in its operative position.

5. In a typewriting machine, a main frame having key levers and type bars mounted therein, a universal rock shaft journaled on a fixed axis in said main frame, a platen carriage frame mounted on said main frame for movement into and out of operative position, ribbon feed mechanism mounted on said platen carriage frame, and means fixed on said universal rock shaft for actuating said ribbon feed mechanism when said platen carriage frame is in its operative position.

6. In a typewriting machine, a main frame having key levers and type bars mounted therein, a universal rock shaft journaled on a fixed axis in said main frame, a platen carriage frame mounted on said main frame for movement into and out of operative position, ribbon vibrator mechanism mounted on said platen carriage frame, and means fixed on said universal rock shaft for actuating said ribbon vibrator mechanism when said platen carriage frame is in its operative position.

7. In a typewriting machine, a main frame having key levers and type bars mounted therein, a universal rock shaft journaled in said main frame, a universal bar actuated by said type bars for oscillating said rock shaft, ribbon feed mechanism mounted on said platen carriage frame, automatic means for reversing said feed mechanism, means on said universal rock shaft for actuating said ribbon feed mechanism, and means on said universal rock shaft for actuating said ribbon reversing mechanism.

8. In a typewriting machine, a main frame having key levers and type bars mounted therein, a universal bar actuated by said type bars, a universal rock shaft journaled in said main frame and actuated by said universal bar, a platen carriage frame mounted on said main frame and movable into and out of operative position, escapement mechanism mounted on said platen carriage frame, ribbon feed mechanism mounted on said platen carriage frame, ribbon vibrator mechanism mounted on said platen carriage frame, automatic reverse mechanism for said ribbon feed mechanism mounted on said platen carriage frame, and means carried by said universal rock shaft for actuating said escapement mechanism, ribbon vibrator mechanism, ribbon feed mechanism and ribbon reverse mechanism.

9. In a typewriting machine, a main frame having key levers and type bars mounted therein, a universal bar actuated by said type bars, a universal rock shaft journaled in said main frame and actuated by said universal bar, a platen carriage frame mounted on said main frame and movable into and out of operative position, escapement mechanism mounted on said platen carriage frame, ribbon vibrator mechanism mounted on said platen carriage frame, automatic reverse mechanism for said ribbon feed mechanism mounted on said platen carriage frame, and means carried by said universal rock shaft for actuating said escapement mechanism, ribbon vibrator mechanism, ribbon feed mechanism and ribbon reverse mechanism, said actuating means being positioned on said shaft to automatically assume operative relation with said platen carriage frame when said platen carriage frame is in operative position but separable therefrom when said platen carriage frame is moved to inoperative position.

10. In a typewriting machine, a main frame, a type bar segment mounted in said main frame for case shift movement, a universal bar in said main frame and movable in unison with said type bar segment, a universal rock shaft journaled in said main frame and having a fixed axis therein, and means for oscillating said rock shaft from said universal bar for both case positions of said type bar segment.

11. In a typewriting machine, a main frame having key levers therein, a type bar segment mounted in said main frame for vertical movement, a platen carriage frame pivoted on said main frame, means for holding said platen carriage frame in fixed operative position on said main frame, resilient means for holding said type bar segment in its uppermost position, a shift lever for moving said type bar segment downwardly to change from one case to another, a universal rock shaft journaled in said main frame, operating mechanism on said platen carriage frame actuated by said rock shaft, and means actuated by said universal bar for different case positions of said type bar segment to oscillate said rock shaft.

12. In a typewriting machine, a main frame, a universal rock shaft journaled therein, type bars arranged to oscillate said rock shaft, a space key, means actuated by said space key for oscillating said rock shaft independently of said type bars, a platen carriage frame movably mounted on said main frame, escapement mechanism on said platen carriage frame, and means on said rock shaft for actuating said escapement mechanism.

13. In a typewriting machine, a main frame having key levers and type bars mounted therein, a universal bar actuated by said type bars, a rock shaft actuated by said universal bar, a platen carriage frame movably mounted on said main frame, escapement mechanism carried by said platen carriage frame, a space key mounted in said main frame, means actuated by said space key for oscillating said rock shaft independently of said type bars, and means on said rock shaft for actuating said escapement mechanism.

14. In a typewriting machine, a main frame having key levers and type bars mounted therein, a shiftable segment for supporting said type bars, a universal bar arranged to shift with said segment, a universal rock shaft journaled in said main frame, a contact member on said universal bar, and an arm on said rock shaft arranged to engage said universal bar for the different positions of adjustment of said type bar segment.

15. In a typewriting machine, a main frame having key levers and type bars mounted therein, a universal bar actuated by said type bars, a universal rock shaft actuated by said universal bar, said rock shaft having an arm fixed thereon, a spring for holding said rock shaft in one position, a space key, and a slide bar mounted on said main frame and actuated by said space key to engage said arm and oscillate said rock shaft against the tension of said spring.

16. In a typewriting machine, the combination with a main frame having key levers and type bars mounted therein, of a universal rock shaft journaled in said main frame and actuated by said type bars, said rock shaft having a pair of arms fixed thereon, a platen carriage frame, and ribbon vibrator mechanism mounted on said platen carriage frame, said vibrator mechanism comprising an operating member shiftable to different positions of adjustment for engaging one or the other of the arms on said rock shaft to move the ribbon to different positions, said operating member being movable to its different positions of adjustment at the will of the operator.

17. In a typewriting machine, a main frame having key levers and type bars mounted therein, a universal rock shaft journaled in said main frame, a platen carriage frame movably mounted on said main frame, platen stop mechanism on said platen carriage frame, and means controlled by said stop mechanism for preventing oscillation of said universal rock shaft.

18. In a typewriting machine, a main frame having key levers and type bars mounted therein, a platen carriage frame mounted on said main frame for movement into inoperative position, a platen arranged to travel on said platen carriage frame, stop mechanism for arresting the movement of said platen, a universal rock shaft journaled in said main frame and actuated by said type bars, and means controlled by said stop mechanism for preventing oscillation of said rock shaft.

19. In a typewriting machine, a main frame having a universal rock shaft journaled therein, a platen carriage frame, escapement mechanism mounted on said platen carriage frame and actuated by said universal rock shaft, a platen carriage arranged to travel on said platen carriage frame and controlled by said escapement mechanism, means mounted on said platen carriage frame for releasing said escapement mechanism to permit movement thereof independently of said escapement mechanism, and means on said main frame for actuating said releasing means.

20. In a typewriting machine, a main frame having key levers and type bars mounted therein, a universal bar actuated by said type bars, a universal rock shaft journaled in said main frame and oscillated by said universal bar, a platen carriage frame foldably mounted on said main frame, a platen carriage mounted to travel on said platen carriage frame, escapement mechanism on said platen carriage frame for controlling said platen carriage, means on said universal rock shaft for actuating escapement mechanism, said means being disconnectible from said escapement mechanism when said platen carriage is folded, means on said platen carriage frame for releasing said escapement mechanism to permit movement of said platen carriage independent of said escapement mechanism, and a key lever on said main frame for actuating said releasing means, said key lever being disconnectible from said releasing means when said platen carriage is folded.

21. In a typewriting machine, a main frame, a universal rock shaft journaled in said main frame, a platen carriage frame movably mounted on said main frame, a platen carriage arranged to travel on said platen carriage frame, escapement mechanism on said platen carriage frame for controlling the movement of said platen carriage, means on said universal rock shaft for actuating said escapement mechanism, a tabulator stop on said platen carriage frame, a tabulator key lever on said main frame, and means on said platen carriage frame arranged to engage said tabulator key lever to operate said tabulator stop and to release said escapement mechanism when said tabulator key lever is depressed.

22. A compactible typewriter comprising a main frame, a platen carriage frame pivoted on said main frame for movement into and out of operative position, said platen carriage frame comprising a pair of arms and a bed plate mounted on said arms, a platen arranged to travel on said bed plate, escapement mechanism on said bed plate for controlling the movement of said platen, ribbon spools mounted on said arms, feed mechanism mounted on said bed plate for rotating said ribbon spools, ribbon vibrator mechanism mounted on said bed plate, a universal rock shaft journaled in said main frame, and separable connections between said rock shaft and said escapement mechanism, ribbon feed mechanism, and ribbon vibrator mechanism.

23. In a compactible typewriter, a main frame, a platen carriage frame comprising a pair of arms pivoted on said main frame, a bed plate mounted on said arms, a platen carriage arranged to travel on said bed plate, ribbon mechanism mounted on said arms and bed plate, a universal rock shaft journaled in said main frame and having a plurality of fingers thereon, and operating means on said bed plate for said ribbon mechanism and said platen, said operating means having separable connection with the arms on said universal rock shaft to permit said bed plate to be folded away from operative position on said main frame to bring said platen into compacted relation with said main frame.

24. A compactible typewriter comprising a main frame having a pair of arms pivoted thereon, a bed plate mounted on said arms, a platen carriage arranged to travel on said bed plate and movable with said bed plate into position at the front of said platen carriage, and ribbon spools mounted on said arms at an oblique angle relative thereto.

25. In a compactible typewriter, a main frame having key levers and type bars mounted therein, a pair of arms pivoted on said main frame, a bed plate carried by said arms, a platen carriage arranged to travel on said bed plate and foldable on said arms into position at the front of said main frame, ribbon spools mounted on said arms in front of said platen carriage and at an oblique angle thereon, means on said bed plate for rotating said ribbon spools, and means on said main frame separably engaging said rotating means to actuate the same.

26. In a typewriting machine, a main frame, a platen carriage frame foldably mounted on said main frame, a platen carriage arranged to travel on said platen carriage frame, escapement mechanism for controlling said platen carriage, a universal rock shaft mounted on said main frame, means on said rock shaft for separably engaging said escapement mechanism to actuate the same, and back spacing mechanism mounted on said main frame and separably engaging said escapement mechanism for operating said escapement mechanism in a reverse direction.

27. In a typewriting machine, a main frame, a platen carriage frame pivoted on said main frame, a platen carriage arranged to travel on said platen carriage frame, an escapement wheel journaled in said platen carriage frame for controlling said platen carriage, a spring drum mounted on said platen carriage frame for actuating said platen carriage, a dog rocker, dogs on said rocker for engaging said escapement wheel, a universal rock shaft journaled in said main frame, means on said rock shaft separably engaging said dog rocker to actuate the same, a back spacing lever mounted on said main frame, a link on said main frame actuated by said back spacing lever, said link having a pin thereon for separably engaging said escapement wheel, a spring for holding said pin out of engagement with said escapement wheel, and means for directing said pin into engagement with said escapement wheel when said back spacing lever is depressed, said means permitting rotation of said pin with said escapement wheel on further depression of said back spacing key.

28. In a typewriting machine, a main frame, a platen carriage frame foldably mounted on said main frame, ribbon feed mechanism mounted on said platen carriage frame, ribbon spools mounted on said platen carriage frame, reverse mechanism for said ribbon feed mechanism mounted on said platen carriage frame, a universal rock shaft having cam fingers secured thereto, and means controlled by the ribbon on said spools for engaging said cam fingers to operate said ribbon reverse mechanism when the ribbon is unwound from one of said spools.

29. In a typewriting machine, a main frame, a platen carriage frame comprising a pair of arms, a bed plate mounted on said arms, ribbon spools journaled on said arms, a slide bar mounted on said bed plate, means carried by said slide bar for actuating said ribbon spools, a universal rock shaft journaled in said main frame, fingers carried by said rock shaft for actuating said ribbon spool actuating means, means on said rock shaft for shifting said bar to reverse the operation of said ribbon spool actuating means, and ribbon controlled means for causing operative connection with said reversing means and said slide bar.

30. In a typewriting machine, a main frame having key levers and type bars mounted therein, a universal rock shaft journaled in said main frame, a universal bar for actuating said rock shaft, a platen carriage frame pivoted on said main frame, ribbon spools journaled on said platen carriage frame, ribbon reversing mechanism mounted on said platen carriage frame, and separate means on said universal rock shaft for actuating said ribbon feed mechanism and said ribbon reversing mechanism.

31. In a typewriting machine, a main frame, a universal bar mounted in said main frame, a universal rock shaft journaled in said main frame and actuated by said universal bar, a platen carriage frame having escapement mechanism, ribbon vibrator mechanism, ribbon feed mechanism, ribbon reverse mechanism and line lock mechanism mounted thereon, and separate means mounted on said universal rock shaft for separably engaging said escapement mechanism, ribbon vibrator mechanism, ribbon feed mechanism, ribbon reverse mechanism and line lock mechanism.

In testimony whereof I have signed my name to this specification on this 4th day of June, A. D. 1924.

OTTO A. HOKANSON.